United States Patent [19]

Adamczyk, Jr. et al.

[11] Patent Number: 5,419,124
[45] Date of Patent: May 30, 1995

[54] AUTOMOTIVE ENGINE EXHAUST AFTERTREATMENT SYSTEM INCLUDING HYDROCARBON ADSORBER WITH SAMPLE PROCESSING OXYGEN SENSOR REGENERATION CONTROL

[75] Inventors: Andrew A. Adamczyk, Jr., Dearborn, Mich.; Ronald G. Hurley, Shenfield, United Kingdom; James D. Pakko, Dearborn, Mich.

[73] Assignee: Ford Motor Company, Dearborn, Mich.

[21] Appl. No.: 254,857

[22] Filed: Jun. 6, 1994

Related U.S. Application Data

[62] Division of Ser. No. 131,356, Oct. 4, 1993, Pat. No. 5,355,672.

[51] Int. Cl.⁶ ............................................. F01N 3/20
[52] U.S. Cl. ............................. 60/274; 60/276; 60/285; 60/288
[58] Field of Search .................. 60/274, 276, 286, 287, 60/289, 293, 300, 311, 324, 297; 123/703, 672

[56] References Cited

U.S. PATENT DOCUMENTS

| | | | |
|---|---|---|---|
| 3,674,441 | 7/1972 | Cole | 60/297 |
| 5,179,833 | 1/1993 | Koroda et al. | 60/276 |
| 5,224,347 | 7/1993 | Yakabe et al. | 60/276 |
| 5,251,438 | 10/1993 | Ishida et al. | 60/276 |
| 5,253,476 | 10/1993 | Levendis | 60/311 |
| 5,259,189 | 11/1993 | Baier | 60/276 |

*Primary Examiner*—Ira S. Lazarus
*Assistant Examiner*—Daniel J. O'Connor
*Attorney, Agent, or Firm*—Jerome R. Drouillard; Roger L. May

[57] ABSTRACT

An automotive internal combustion engine is equipped with a hydrocarbon adsorber for the purpose of controlling the emissions of unburned hydrocarbons from the vehicle's tailpipe. Regeneration of the adsorber is achieved by an electronic engine controller operating an air pump and a sample pump, using information from an exhaust gas oxygen sensor.

2 Claims, 1 Drawing Sheet

AUTOMOTIVE ENGINE EXHAUST AFTERTREATMENT SYSTEM INCLUDING HYDROCARBON ADSORBER WITH SAMPLE PROCESSING OXYGEN SENSOR REGENERATION CONTROL

This is a division of application Ser. No. 08/131,356, filed Oct. 4, 1993, now U.S. Pat. No. 5,355,672.

BACKGROUND OF THE INVENTION

The present invention relates to an automotive engine having an exhaust gas aftertreatment system designed not only to dispose of exhaust gas hydrocarbons catalytically, but also to store such hydrocarbons during certain operating modes of the engine so that the hydrocarbons may be processed at some time following their storage.

DESCRIPTION OF THE PRIOR ART

One of the regulated exhaust emission constituents from automotive vehicles is unburned hydrocarbon ("HC"). This exhaust gas constituent is formed due to a number of operating conditions within the engine. In order to limit the tailpipe emissions of HC, it is currently necessary to equip vehicles with catalytic exhaust gas treatment devices located downstream from the engine. Such devices include the conventional oxidation catalyst ("COC") and the three-way catalyst ("TWC"). The conventional oxidation catalyst, as its name implies, serves to further oxidize unburned HC and carbon monoxide to carbon dioxide and water. The TWC, however, serves to not only oxidize HC and carbon monoxide, but also serves to reduce oxides of nitrogen.

Catalytic exhaust aftertreatment devices must reach a nominal operating temperature before the conversion rate of the material passing through the catalyst reaches a functional level. As a result, it is not possible to obtain much conversion immediately after a cold engine is started. Cold engine operation accordingly accounts for a good percentage of the exhaust gas hydrocarbons emitted by regulated vehicles. In response to the recognition of the inefficiency of cold catalytic after-treatment devices, it has been proposed, for example, in U.S. Pat. No. 5,051,244 (Dunne et al.) to use a hydrocarbon adsorber positioned upstream of a catalyst, for the purpose of removing hydrocarbons from the exhaust at times when the catalyst has not obtained a sufficient operating temperature. The hydrocarbon adsorber serves to store the exhaust hydrocarbon until such time as the catalytic device has heated sufficiently to handle the hydrocarbon material when it is desorbed. Unfortunately, the device of the '244 patent suffers from the deficiency that the flow of desorbed material may very well upset the required balance of oxidizer and hydrocarbon material necessary to achieve complete catalysis in the catalytic after-treatment device. It is an object and an advantage of the present invention that regeneration of a hydrocarbon adsorber may be achieved without upsetting the chemical balance required for catalysis to occur at high efficiency within a downstream catalyst.

SUMMARY OF THE INVENTION

An automotive engine and exhaust emission control system comprises an internal combustion engine, an exhaust hydrocarbon adsorber for receiving exhaust from the engine, a downstream catalytic exhaust gas treatment device mounted downstream from the hydrocarbon adsorber for treating effluent from the hydrocarbon adsorber, an upstream catalytic exhaust gas treatment device mounted upstream of the hydrocarbon adsorber for receiving exhaust flowing from the engine, and an air pump for selectively supplying air to the hydrocarbon adsorber for the purpose of adjusting the stoichiometry of the exhaust mixture flowing to the downstream catalytic device and for assisting the desorption of hydrocarbon material from the adsorber. Desorption is promoted principally by allowing a controlled flow of clean exhaust gas through the adsorber. An exhaust gas oxygen sensor located between the engine and the upstream catalytic device senses the concentration of oxygen in the exhaust stream entering the upstream catalytic device. A sample pump draws a small amount of exhaust gas downstream from the hydrocarbon adsorber but upstream of the downstream catalyst. The sampled exhaust is injected into the exhaust system before the exhaust gas oxygen sensor. An engine control computer connected with the oxygen sensor and the air pump, as well as with the sample pump, controls the operation of the air pump and the sample pump such that the exhaust gas oxygen is measured both when the sample is being injected and when the sample pump is stopped. Thereafter, the computer controls the air pump and the valving which controls the flow of exhaust through the adsorber in response to the sensed oxygen corresponding to the condition in which the air pump is being operated, such that the amount of oxygen in the exhaust flowing into the downstream catalytic device will be suitable for oxidizing the hydrocarbon material contained in the exhaust, including the desorbed hydrocarbon material from the adsorber. In effect, the air pump is used to adjust the stoichiometry of the exhaust flow so as to permit the desired catalysis to occur.

The catalytic devices may comprise either a conventional oxidizing catalysts or three-way catalysts, or a combination of the two. In the case that conventional oxidizing catalysts are used, the engine control computer will control the air pump such that the amount of air supplied to the adsorber will provide sufficient oxygen to oxidize the hydrocarbon material in the combined exhaust stream at an oxygen supply rate of 0.95 to 1.10 times the amount of air corresponding to the stoichiometric air/fuel ratio. In the case of a three-way catalyst mounted downstream of the hydrocarbon adsorber, the engine control computer will control the air pump such that the amount of air supplied to the adsorber will contain an amount of oxygen corresponding to the stoichiometric air/fuel ratio.

DETAILED DESCRIPTION OF THE PREFERRED EMBODIMENTS

Figure 1:
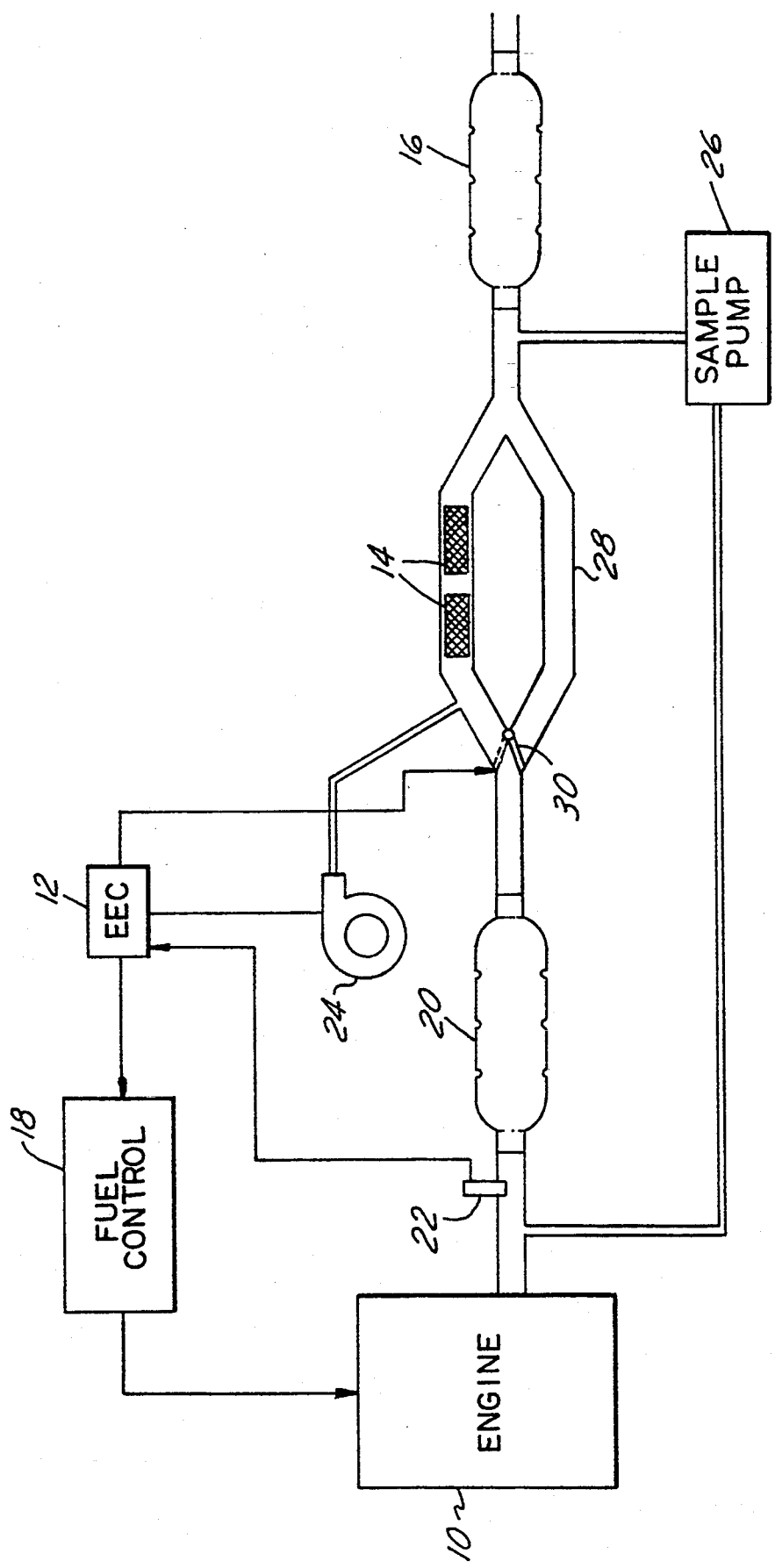
FIG. 1 is a schematic representation of a system according to the present invention.

As shown in the Figure, automotive engine 10 has an exhaust emission control system including exhaust hydrocarbon adsorber 14 for receiving exhaust from the engine, and a downstream exhaust gas treatment device 16 which, as its description implies, is mounted downstream of hydrocarbon adsorber 14. An upstream exhaust treatment device, 20, is located immediately adjacent engine 10. The exhaust treatment devices other than the hydrocarbon adsorber may comprise either a conventional oxidizing catalyst or a three-way catalyst of the types known to those skilled in the art and suggested by this disclosure.

Untreated exhaust gas flowing from the engine first encounters exhaust gas oxygen sensor 22 which, acting in concert with engine control computer 12 and fuel control 18, controls the air/fuel ratio at which engine 10 is operated such that the necessary oxidant and reductant are contained within the exhaust flowing from the engine to achieve the optimal level of exhaust aftertreatment in upstream catalyst 20.

As noted above, when engine 10 is first started, neither of the catalysts will be at the temperature required for the catalytic reactions to occur. As a result, during cold catalyst operation, bypass valve 30 will be in the closed position (shown in solid lines) so as to direct all of the exhaust gas leaving the engine through hydrocarbon adsorber 14. The hydrocarbon adsorber may be constructed of a carbon monolith or pelleted carbon or zeolite having a suitable washcoat, or other materials known to those skilled in the art and suggested by this disclosure. Although adsorber 14 is shown as having two adsorbing elements, those skilled in the art will further appreciate that a single element or a variety of elements could be used having not only a single flow path, but alternatively, multiple flow paths according to the present invention. In any event, gases emanating from engine 10 during cold operation will pass through adsorber 14, and then through downstream catalyst 16.

When engine 10 is started cold, all of the exhaust will be routed through adsorber 14. Once upstream catalyst 20 has reached operating temperature, bypass valve 30 will be moved by engine control computer 12 to the dotted line position, thereby allowing exhaust gas to pass predominately through bypass 28 as opposed to passing entirely through hydrocarbon adsorber 14. In this manner hydrocarbon adsorber 14 will be protected from excessively high operating temperature, while nevertheless receiving the heat energy from the low rate flow of exhaust, which assists in the desorption process. Simultaneously, downstream catalyst 16 will continue warming to operating temperature.

The regeneration of adsorber 14 is managed by engine control computer 12 to achieve desorption of hydrocarbon material from adsorber 14 without upsetting the catalysis occurring within downstream catalyst 16. To accomplish this, it is necessary that the exhaust stream flowing to catalyst 16 have a controlled amount of oxidant sufficient to promote catalysis within the downstream catalytic unit. This is achieved by controlling air pump 24 and valve 30 by engine control computer 12, using information from exhaust gas oxygen sensor 22.

Sensor 22 senses the concentration of oxygen in the exhaust stream entering upstream catalyst 20. Engine control computer 12 receives information from sensor 22 regarding this concentration and controls air pump 24, either by pulse width modulation of the rotational speed of a motor (not shown) driving air pump 24, or by controlling a solenoid valve (not shown) interposed between air pump 24 and hydrocarbon adsorber 14. In order to provide oxygen sensor 22 with a proper sample to determine the required amount of air from air pump 24, sample pump 26 and air pump 24 are both operated once the catalytic treatment devices reach operating temperature. Sample pump 26 draws a sample of exhaust immediately downstream of adsorber 14 and injects the sampled exhaust via sample line 32 into the exhaust system upstream of sensor 22. Sensor 22 then determines the amount of oxygen contained in the combined flow of exhaust including the air and desorbed hydrocarbon material from adsorber 14. Then, sample pump 26 is shut off and the exhaust gas oxygen is again sensed by sensor 22. Computer 12 will then compare the two sensed oxygen levels and select the speed of operation of air pump 24 such that the amount of air contained in the combined stream entering downstream catalyst 16 provides an appropriate level of oxidant and reductant for the type of catalyst used at the downstream position. For example, computer 12 will control air pump 24 such that the air pumped through adsorber 14 provides 0.95 to 1.10 times the amount of oxidant corresponding to the stoichiometric air/fuel ratio in the event that a conventional oxidizing catalyst 16 is used. In the event that the three-way catalyst is used as element 16, engine control computer 12 will supply sufficient air to hydrocarbon adsorber 14 such that the oxidant contained in the exhaust stream flowing into catalyst 16 is approximately at a stoichiometric air/fuel ratio. Regardless of the type of catalyst employed at either the upstream or downstream positions, computer 12 will control the air/fuel ratio supplied to the engine using fuel control 18 so as to furnish an appropriate level of oxidant and reductant to catalyst 20.

Whenever regeneration of adsorber 14 is occurring, computer 12 may control not only the amount of air supplied to adsorber 14 as previously described, but also the amount of exhaust being allowed to pass from converter 20 and past valve 30 into adsorber 14. The volume of exhaust passing through adsorber 14 must be such that the capacity of air pump 24 to provide oxygenate (air) to the exhaust stream is not exceeded.

Those skilled in the art will understand that variations and modifications may be made to the present invention without departing from the spirit and scope of the invention as defined in the appended claims.

We claim:

1. A method for using a sample stream and oxygen sensor to control the regeneration of an automotive internal combustion engine exhaust hydrocarbon adsorber employed in an exhaust treatment system incorporating at least one catalytic exhaust treatment device, comprising the steps of:

routing the engine exhaust through the adsorber when the engine is started and until the catalytic treatment device reaches operating temperature;

operating an air pump to supply air to adjust the amount of oxygen in the exhaust stream flowing from the adsorber;

operating a sample pump to draw a sample of exhaust immediately downstream of the adsorber after the catalytic treatment device reaches operating temperature, and injecting the sampled exhaust into the exhaust flowing from the engine upstream of said catalytic device;

sensing the oxygen contained in the combined engine exhaust and sample flowing into the catalytic device; and adjusting the flow of air from the air pump such that the amount of oxidant and reductant contained in the combined exhaust gas flowing to the catalytic device is within the operating range of the device.

2. A method according to claim 1, further comprising the step of sensing the oxygen contained in the exhaust flowing from the engine when at least the sample pump is not running, and adjusting the fuel supplied to the engine such that the exhaust flowing from the engine contains the amount of oxidant and reductant necessary to operate the catalytic device.

* * * * *